United States Patent
Cudak et al.

(10) Patent No.: US 10,997,288 B2
(45) Date of Patent: May 4, 2021

(54) DETECTING A COMPROMISED SYSTEM USING AN INTEGRATED MANAGEMENT CONTROLLER

(71) Applicant: LENOVO ENTERPRISE SOLUTIONS (SINGAPORE) PTE. LTD., Singapore (SG)

(72) Inventors: Gary D. Cudak, Wake Forest, NC (US); John M. Petersen, Wake Forest, NC (US); Shareef F. Alshinnawi, Apex, NC (US); Ajay Dholakia, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 198 days.

(21) Appl. No.: 15/933,929

(22) Filed: Mar. 23, 2018

(65) Prior Publication Data
US 2019/0294782 A1    Sep. 26, 2019

(51) Int. Cl.
*G06F 21/55* (2013.01)
*G06F 21/56* (2013.01)

(52) U.S. Cl.
CPC ......... *G06F 21/552* (2013.01); *G06F 21/56* (2013.01); *G06F 2221/034* (2013.01)

(58) Field of Classification Search
CPC ... G06F 21/552; G06F 21/56; G06F 2221/034
See application file for complete search history.

(56) References Cited

U.S. PATENT DOCUMENTS

| 2010/0241974 A1* | 9/2010 | Rubin | G06F 21/56 715/764 |
| 2016/0328561 A1* | 11/2016 | Tamir | G06F 21/566 |
| 2017/0364792 A1* | 12/2017 | Chai | G06N 3/0445 |

* cited by examiner

*Primary Examiner* — Ayoub Alata

(57) ABSTRACT

Detecting a compromised system using an integrated management controller including receiving a workload characterization for an expected hardware utilization of a computing system, wherein the workload characterization is a pattern of expected hardware utilization of computing hardware on the computing system, and wherein the workload characterization comprises hardware utilization thresholds; storing the workload characterization on an integrated management controller communicatively coupled to the computing hardware on the computing system; monitoring the computing hardware of the computing system using the integrated management controller, including comparing the hardware utilization thresholds of the workload characterization to measured hardware utilization of the computing hardware; determining that the computing system is compromised based on detecting that the measured hardware utilization of the computing hardware has exceeded one of the hardware utilization thresholds of the workload characterization; and performing a notification action in response to determining that the computing system is compromised.

17 Claims, 6 Drawing Sheets

DETECTING A COMPROMISED SYSTEM USING AN INTEGRATED MANAGEMENT CONTROLLER

BACKGROUND

Field of the Invention

The field of the invention is data processing, or, more specifically, methods, apparatus, and products for detecting a compromised system using an integrated management controller.

Description of Related Art

Securing data center infrastructure is a key focus for data center managers. This focus includes detecting any potential security breaches in any of the systems in the data center. When a system is compromised, any software running within it, including anti-virus or anti-malware programs, may be compromised as well. Compromised security programs may limit notifications or other remedial actions from occurring, which may allow further contamination or exposure of data.

SUMMARY

Methods, systems, and apparatus for detecting a compromised system using an integrated management controller are disclosed in this specification. Detecting a compromised system using an integrated management controller includes receiving a workload characterization for an expected hardware utilization of a computing system, wherein the workload characterization is a pattern of expected hardware utilization of computing hardware on the computing system, and wherein the workload characterization comprises hardware utilization thresholds; storing the workload characterization on an integrated management controller communicatively coupled to the computing hardware on the computing system; monitoring the computing hardware of the computing system using the integrated management controller, including comparing the hardware utilization thresholds of the workload characterization to measured hardware utilization of the computing hardware, wherein the measured hardware utilization of the computing hardware is retrieved by the integrated management controller; determining that the computing system is compromised based on detecting that the measured hardware utilization of the computing hardware has exceeded one of the hardware utilization thresholds of the workload characterization; and performing a notification action in response to determining that the computing system is compromised.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
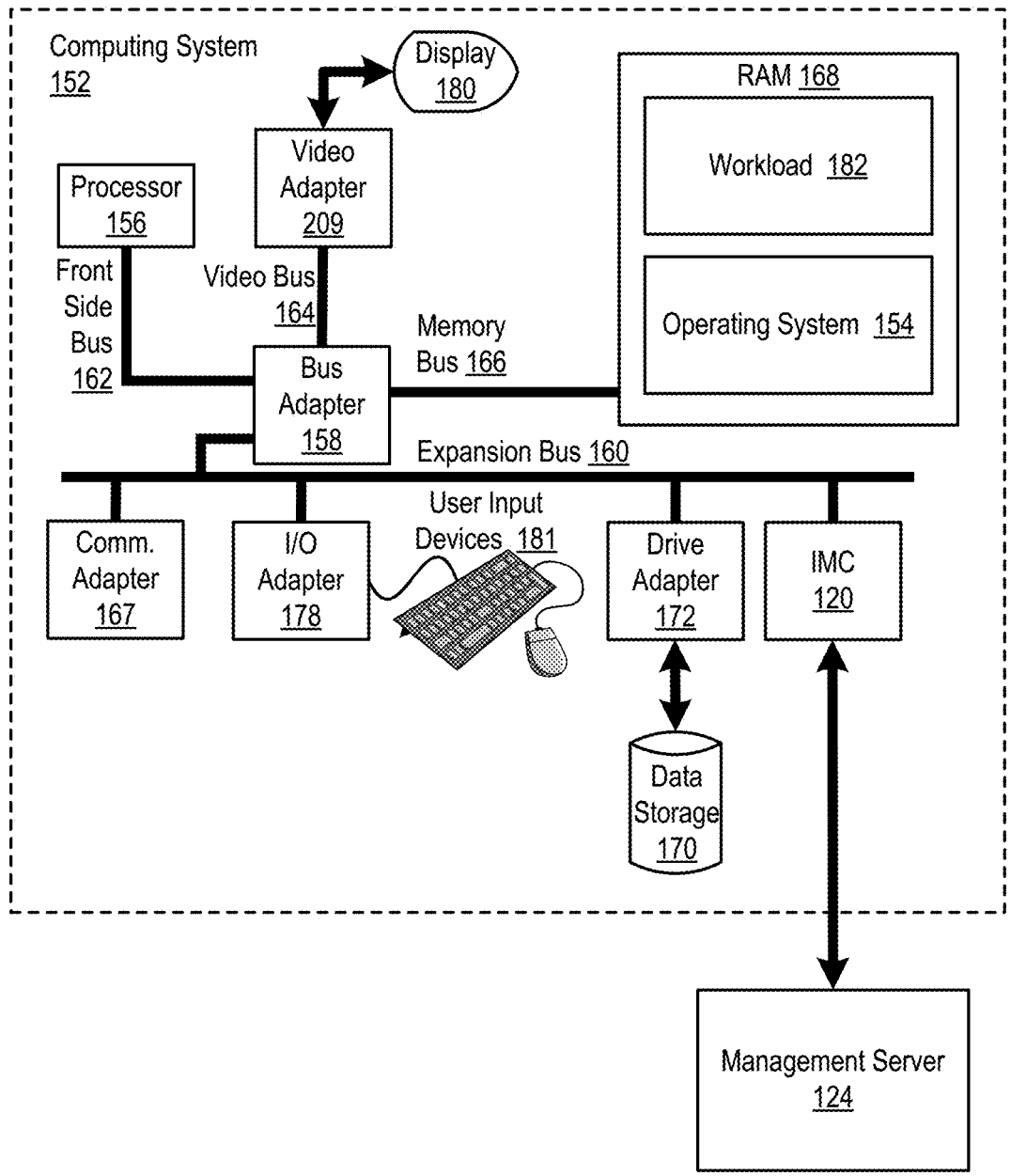
FIG. 1 sets forth a block diagram of an example system configured for detecting a compromised system using an integrated management controller according to embodiments of the present invention.

Exemplary methods, apparatus, and products for detecting a compromised system using an integrated management controller in accordance with the present invention are described with reference to the accompanying drawings, beginning with FIG. 1. FIG. 1 sets forth a block diagram of automated computing machinery comprising an exemplary computing system (152) configured for detecting a compromised system using an integrated management controller according to embodiments of the present invention. The computing system (152) of FIG. 1 includes at least one computer processor (156) or 'CPU' as well as random access memory (168) (RAM') which is connected through a high speed memory bus (166) and bus adapter (158) to processor (156) and to other components of the computing system (152).

Stored in RAM (168) is an operating system (154) and a workload (182). Operating systems useful in computers configured for detecting a compromised system using an integrated management controller according to embodiments of the present invention include UNIX™ Linux™, Microsoft Windows™, AIX™, IBM's iOS™, and others as will occur to those of skill in the art. The operating system (154) and workload (182) in the example of FIG. 1 are shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for detecting a compromised system using an integrated management controller according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computing hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for detecting a compromised system using an integrated management controller according to embodiments of the present invention include modems for wired dial-up communications, Ethernet (IEEE 802.3) adapters for wired data communications, and 802.11 adapters for wireless data communications.

The exemplary computing system (152) of FIG. 1 also includes an integrated management controller (IMC) (120) communicatively coupled to a management server (124). Although the IMC (120) is shown in FIG. 1 as being coupled to the expansion bus (160), the IMC (120) may include multiple connections into different elements on the computing system (152). For example, the IMC (120) may include dedicated communication lines to the memory, processor, storage, communications adapter, and drive adapter.

Figure 2:
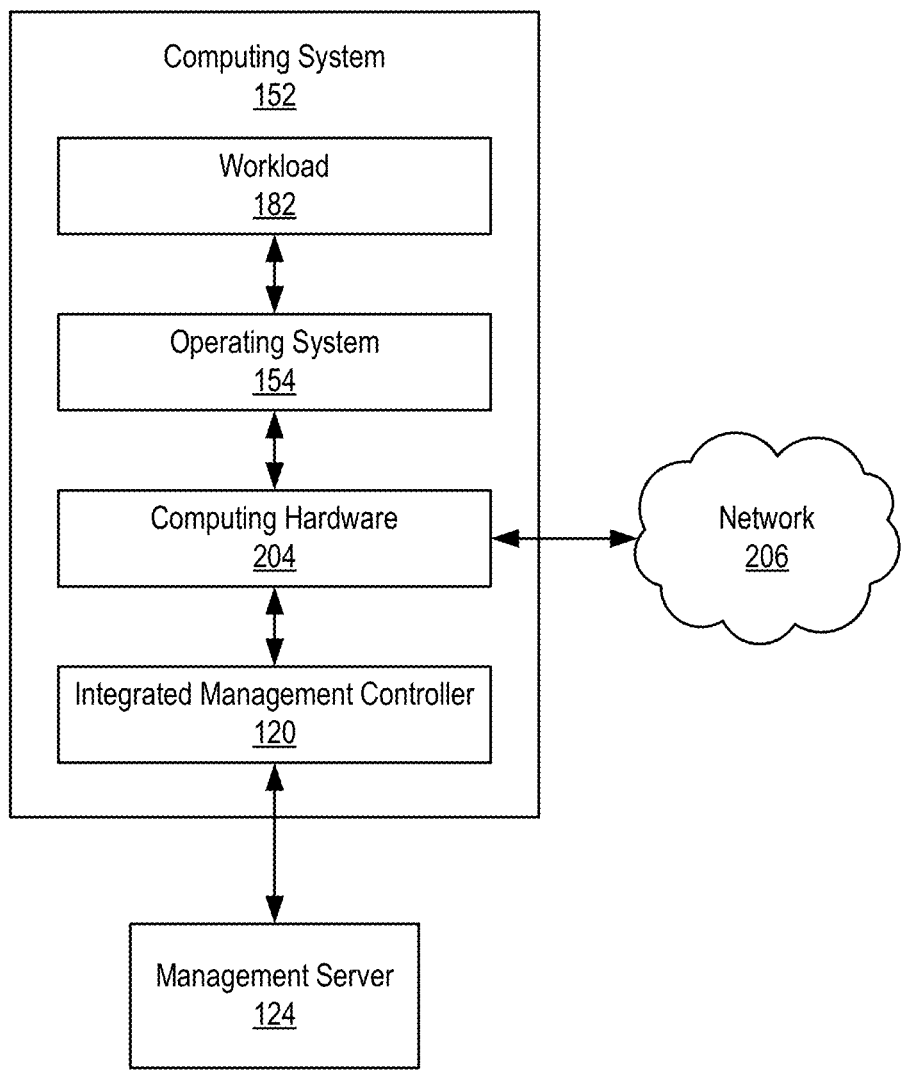
FIG. 2 sets forth a block diagram of an example system configured for detecting a compromised system using an integrated management controller according to embodiments of the present invention.

FIG. 2 shows an exemplary system for detecting a compromised system using an integrated management controller according to embodiments of the present invention. Specifically, FIG. 2 shows an abstraction of some of the computing hardware and software shown in FIG. 1. As shown in FIG. 2, the exemplary system includes a computing system (152) that includes a workload (182) executing within an operating system (154), which in turn is executing on the computing hardware (204). The computing hardware (204) is communicatively coupled to an IMC (120) within the computing system (120), as well as a network (206). The IMC (120) is communicatively coupled to a management server (124).

The operating system (154) provides access to the computing hardware (204) for the workload (182) and the network (206). The operating system (154) shown in FIG. 2 may represent multiple operating systems executing within a hypervisor.

The workload (182) is a processing job or service performed using the operating system (154) and computing hardware (204). The workload (182) may be associated with a workload characterization. A workload characterization is a pattern of expected hardware utilization of a computing system that includes hardware utilization thresholds. Specifically, the workload characterization provides an expected range of hardware utilization and an expected combination of hardware utilized during a workload execution or idle period. For a given point during the execution of the workload or idle period, the workload characterization provides upper and lower hardware utilization thresholds for the set of computing hardware that define the range of expected hardware utilization. The given point may be a specific time during the workload execution (e.g., start of execution plus 10 minutes) or idle period, or a point in a pattern of computing hardware utilization (e.g., a period of high processor utilization and few disk access requests is followed by a period of low processor utilization and a high number of disk access request).

The workload (182) and/or the operating system (154) may be vulnerable to unauthorized intrusions. Such unauthorized intrusions include infection with malware such as ransomware or other computer viruses. A computing system (152) that has been infiltrated by an unauthorized intrusion (e.g., in the workload or operating system) is referred to as compromised. If the computing system (152) has been compromised, the workload (182) and/or the operating system (154) may appear to be operating properly. The unauthorized intrusion may disable monitoring software (such as antivirus programs), disable notifications of an intrusion, or imitate notifications that indicate no intrusion has been detected.

The computing hardware (204) is the collection of elements on the computing system (152) used to execute the operating system (154) and workload (182). The computing hardware (204) may include one or more processors, memory, storage, cooling systems, power supplies, thermometers, communications controllers or other elements depicted within the computing system (152) in FIG. 1. At least one element within the computing hardware (204) may be communicatively coupled to the network (206).

The IMC (120) is an aggregation of hardware and software that monitors the hardware utilization of the computing hardware (204). The IMC (120) may include computing elements such as a processor, memory, storage, and communication controllers. The IMC may be a system on a chip and may be embedded in the motherboard of the computing system (152) adjacent to the computing hardware (204).

The IMC (120) may be communicatively coupled to the computing hardware (204) via one or more out-of-band connections. The term "out-of-band" refers to a communication path that bypasses one or more other communication paths. An out-of-band communication path bypasses a main (i.e., in-band) communication path. The out-of-band communication path between the IMC (120) and the computing hardware (204) bypasses the operating system (154) (and/or a hypervisor) on the computing system (152).

The IMC (120) may be connected through a separate connection to each element of computing hardware. For example, the IMC (120) may be coupled to a network interface controller via a side-band interface, a memory processor board via a private management bus, and to storage via a separate communication path. The IMC (120) may monitor the hardware utilization for each element of computing hardware to which the IMC (120) is coupled. The IMC (120) may also include functionality to override or augment the operating system's use and access to the computing hardware (204). For example, the IMC (120) may shut down a network controller in order to prevent the operating system from sending or receiving data over the network.

The management server (124) is a system that monitors one or more computing systems. The management server (124) provides a workload characterization for the workload (182) executing on the computing system (152) or idle period for the computing system (152). The management server (124) also receives notifications regarding the status of the workload (182) and the computing system (152) from the IMC (120).

The IMC (120) may also be communicatively coupled to the management server (124) via an out-of-band communication path. The out-of-band communication path between the IMC (120) and the management server (124) bypasses the operating system (154) (and/or a hypervisor) on the computing system (152) and network (206). The management server (124) and the IMC (120) communicate directly without utilizing a communication path through the operating system (154) or network (206). The management server (124) and the IMC (120) may communicate over a management network using network protocols.

Figure 3:
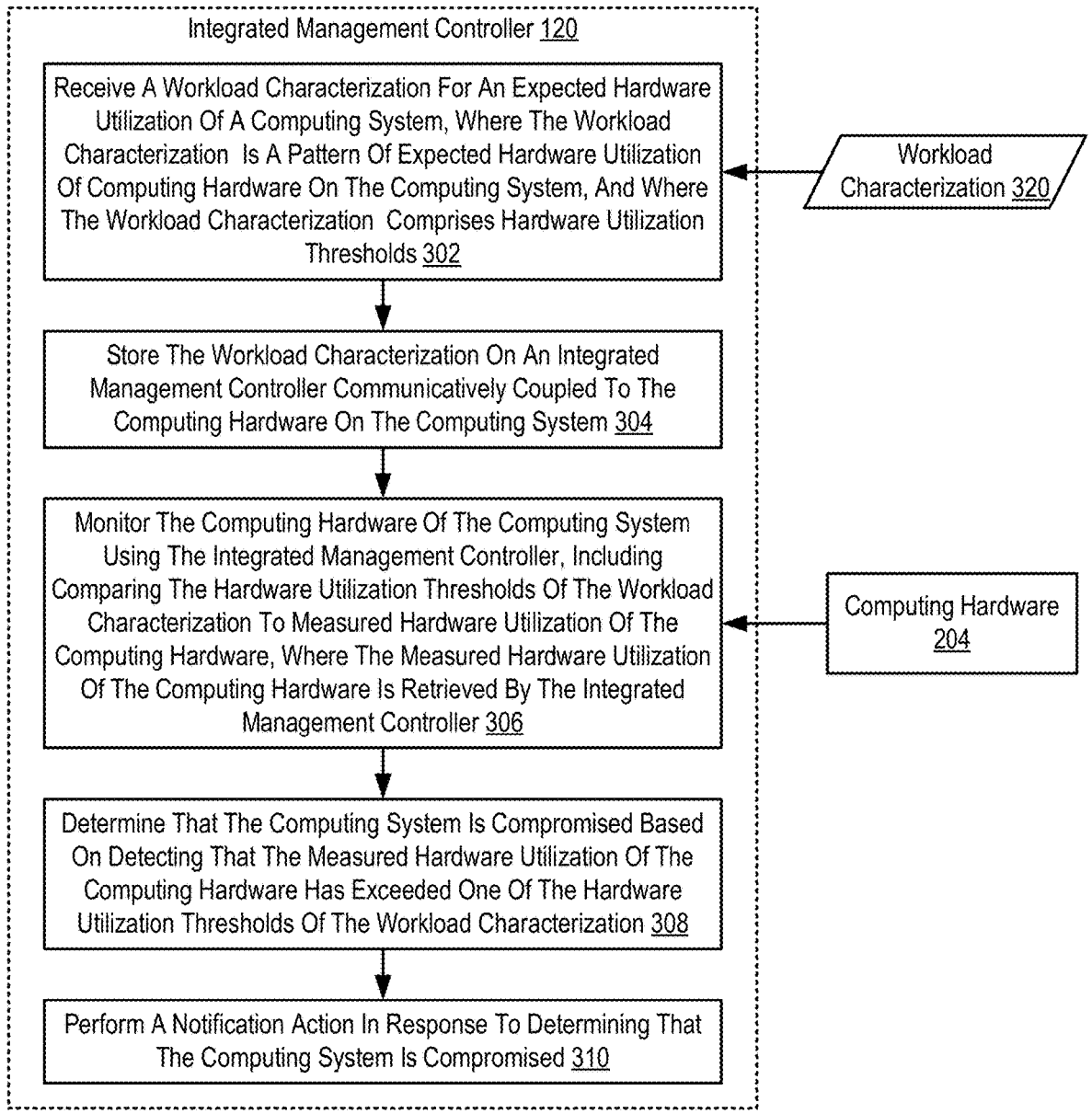
FIG. 3 sets forth a flow chart illustrating an exemplary method for detecting a compromised system using an integrated management controller according to embodiments of the present invention.

For further explanation, FIG. 3 sets forth a flow chart illustrating an exemplary method for detecting a compromised system using an integrated management controller according to embodiments of the present invention that includes receiving (302) a workload characterization (320) for an expected hardware utilization of a computing system, wherein the workload characterization (320) is a pattern of expected hardware utilization of computing hardware on the computing system, and wherein the workload characterization (320) comprises hardware utilization thresholds. Receiving (302) a workload characterization (320) for a workload executing on the computing system, wherein the workload characterization (320) is a pattern of expected hardware utilization of computing hardware on the computing system, and wherein the workload characterization (320) comprises hardware utilization thresholds may be carried out by the IMC (120) receiving the workload characterization (320) from a management server in correlation with the computing system receiving the workload or anticipating an idle period. Once a workload is provided to the computing system, the management server may send a corresponding workload characterization (320) to the IMC (120). Hardware utilization is an amount of activity performed by an element or elements of computing hardware. The expected hardware utilization is an amount of activity anticipated to be performed by an element or elements of computing hardware.

The method of FIG. 3 further includes storing (304) the workload characterization (320) on an integrated management controller (120) communicatively coupled to the computing hardware (204) on the computing system. Storing (304) the workload characterization (320) on an integrated management controller (120) communicatively coupled to the computing hardware (204) on the computing system may be carried out by the IMC (120) using storage within the IMC (120) to store the workload characterization (320).

The method of FIG. 3 further includes monitoring (306) the computing hardware (204) of the computing system using the integrated management controller (120), including comparing the hardware utilization thresholds of the workload characterization (320) to measured hardware utilization of the computing hardware, wherein the measured hardware utilization of the computing hardware is retrieved by the integrated management controller (120). Monitoring (306) the computing hardware (204) of the computing system using the integrated management controller (120) may be carried out by retrieving measured hardware utilization from elements of computing hardware (204). The measured hardware utilization is information about the current or recent activities and state of an element of computing hardware (204). The measured hardware utilization may be periodic or a consistent stream of information. The measured hardware utilization may include, for example, energy used by a processor, percentage of processing power used, number of processors engaged, number of cores engaged, amount of memory used, frequency of memory reads, frequency of memory swaps to disk, frequency of disk access, pattern of disk access, number and frequency of read instructions issued, number and frequency of write instructions issued, number and speed of operating fans, internal temperature, frequency of network communication, and types of network communication.

Comparing the hardware utilization thresholds of the workload characterization (320) to measured hardware utilization of the computing hardware may be carried out by determining whether the measured hardware utilization of any element in the computing hardware (204) exceeds a corresponding upper hardware utilization threshold for that element or falls below a corresponding lower hardware utilization threshold for that element.

The method of FIG. 3 further includes determining (308) that the computing system is compromised based on detecting that the measured hardware utilization of the computing hardware has exceeded one of the hardware utilization thresholds of the workload characterization (320). Determining (308) that the computing system is compromised based on detecting that the measured hardware utilization of the computing hardware has exceeded one of the hardware utilization thresholds of the workload characterization (320) may be carried out by determining that the measured hardware utilization of any element in the computing hardware (204) exceeds a corresponding upper hardware utilization threshold for that element or falls below a corresponding lower hardware utilization threshold for that element.

For example, assume that a computing system is assigned a workload that hosts a cloud-based tax preparation application. The IMC of the computing system may receive a workload characterization for the cloud-based tax preparation application. The workload characterization may indicate that, during a workday, the workload exchanges small amounts of data to a wide variety of external domain addresses and stores and reads small amounts of data to disk frequently. The workload characterization may further indicate that processor utilization remains consistently low during the workday. The IMC stores the workload characterization on storage within the IMC and begins monitoring the computing system.

Continuing with the example, the IMC retrieves measured hardware utilization from the network controller, disk controller, processor, and other computing hardware. The IMC then compares each measured hardware utilization to the corresponding upper and lower hardware utilization thresholds in the workload characterization. This may include comparing the measured processor utilization to the upper processor utilization threshold and lower processor utilization threshold according to the workload characterization.

The computing system in the example, at some point, becomes infected with a ransomware program. The ransomware disables the anti-virus software on the computing system and spoofs periodic all-clear notifications to the management server via an operating system-provided network connection. The ransomware then begins to encrypt the contents of the disk and transmit the contents of the disk to a criminal network overseas.

Continuing with the example, after the infection, the IMC retrieves a measured processor utilization of 98%, a measured storage utilization that indicates that a large amount of data has been read from the disk, and a measured network utilization that indicates a large amount of data has been transmitted to a single external address. The IMC may detect that the measured processor utilization of 98% exceeds an upper processor utilization threshold, that the measured disk utilization frequency falls below a lower disk utilization threshold, that the measured disk utilization read amount exceeds an upper disk utilization threshold, and the measured network utilization exceeds an upper network utilization threshold. Consequently, the IMC may determine that the computing system has been compromised.

The method of FIG. 3 further includes performing (310) a notification action in response to determining that the computing system is compromised. Performing (310) a notification action in response to determining that the computing system is compromised may be carried out by generating an alert indicating that the computing system may be compromised and sending the alter to a management server. The alert may further indicate the type of unauthorized intrusion if the hardware usage pattern matches a known type of unauthorized intrusion.

The above-described steps improve the operation of the computer system by detecting that a computing system is compromised without relying on alerts generated by or via the operating system of the computing system. Specifically, the steps described above utilize an integrated management controller to bypass the operating system (or hypervisor) and monitor the computing hardware on a computing system for indications that the computing system has been compromised.

Figure 4:
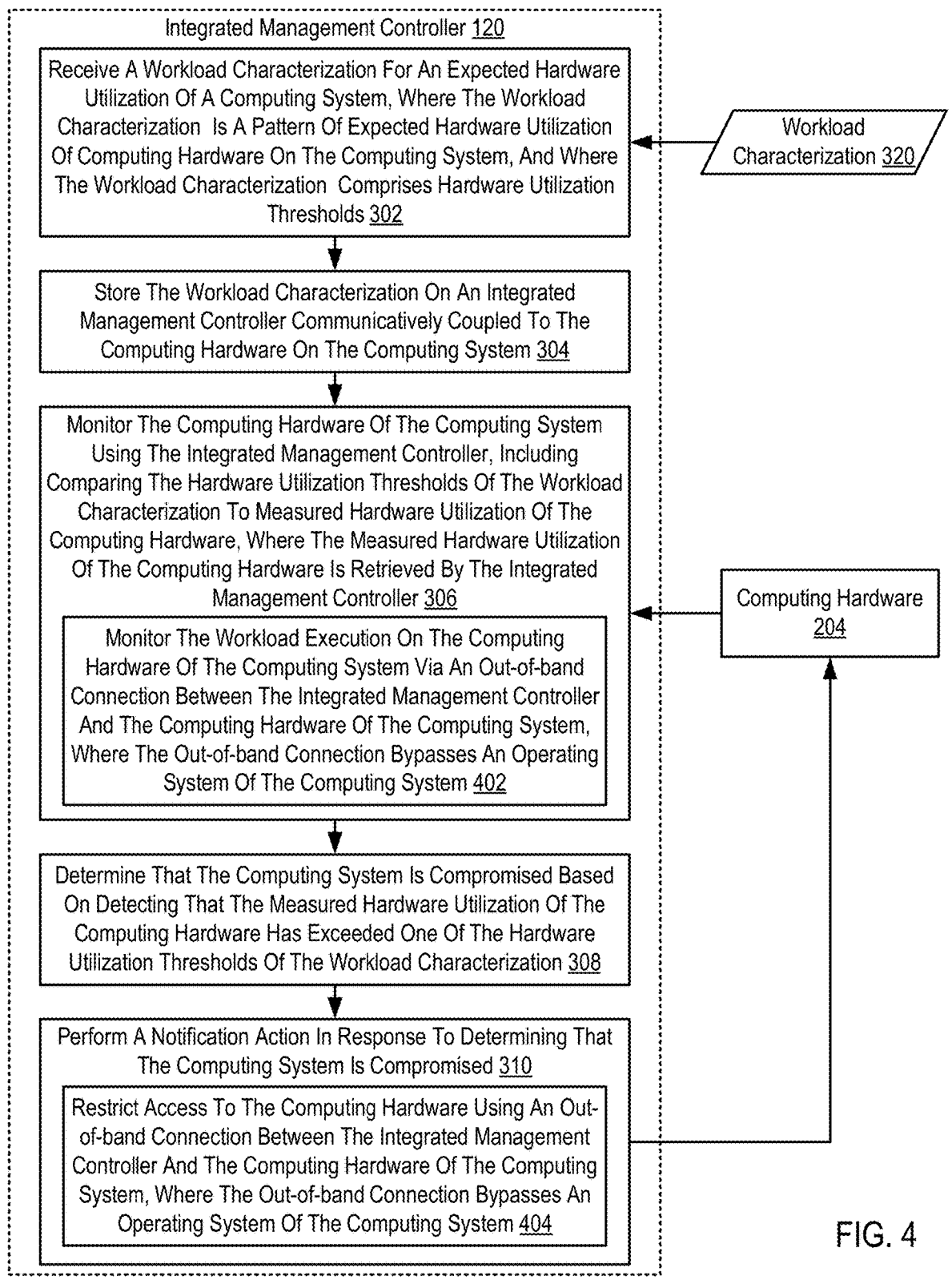
FIG. 4 sets forth a flow chart illustrating an exemplary method for detecting a compromised system using an integrated management controller according to embodiments of the present invention.

For further explanation, FIG. 4 sets forth a flow chart illustrating a further exemplary method for detecting a compromised system using an integrated management controller according to embodiments of the present invention that includes receiving (302) a workload characterization (320) for an expected hardware utilization of a computing system, wherein the workload characterization (320) is a pattern of expected hardware utilization of computing hardware on the computing system, and wherein the workload characterization (320) comprises hardware utilization thresholds; storing (304) the workload characterization (320) on an integrated management controller (120) communicatively coupled to the computing hardware (204) on the computing system; monitoring (306) the computing hardware (204) of the computing system using the integrated management controller (120), including comparing the hardware utilization thresholds of the workload characterization (320) to measured hardware utilization of the computing hardware, wherein the measured hardware utilization of the computing hardware is retrieved by the integrated management controller (120); determining (308) that the computing system is compromised based on detecting that the measured hardware utilization of the computing hardware has exceeded one of the hardware utilization thresholds of the workload characterization (320); and performing (310) a notification action in response to determining that the computing system is compromised.

The method of FIG. 4 differs from the method of FIG. 3, however, in that monitoring (306) the computing hardware (204) of the computing system using the integrated management controller (120), including comparing the hardware utilization thresholds of the workload characterization (320) to measured hardware utilization of the computing hardware, wherein the measured hardware utilization of the computing hardware is retrieved by the integrated management controller (120) includes monitoring (402) the workload execution on the computing hardware (204) of the computing system via an out-of-band connection between the integrated management controller (120) and the computing hardware (204) of the computing system, wherein the out-of-band connection bypasses an operating system of the computing system.

Monitoring the computing hardware of the computing system via an out-of-band connection between the integrated management controller and the computing hardware of the computing system, wherein the out-of-band connection bypasses an operating system of the computing system may be carried out by the IMC (120) monitoring the computing system by using a direct connection to the elements of computing hardware that does not rely on information exchange with the operating system, hypervisor, or programs running on the operating system.

The method of FIG. 4 also differs from the method of FIG. 3 in that performing (310) a notification action in response to determining that the computing system is compromised includes restricting (404) access to the computing hardware (204) using an out-of-band connection between the integrated management controller (120) and the computing hardware (204) of the computing system, wherein the out-of-band connection bypasses an operating system of the computing system. Restricting (404) access to the computing hardware (204) using an out-of-band connection between the integrated management controller (120) and the computing hardware (204) of the computing system, wherein the out-of-band connection bypasses an operating system of the computing system may be carried out by the IMC (120), in response to determining that the computing system is compromised, sending a signal to one or more elements within the computing hardware (204) that augments the ability of the operating system (and programs running on the operating system) to utilize those elements.

Augmenting the ability of the operating system (and programs running on the operating system) to utilize an element of the computing hardware (204) may include, for example, shutting down the element, preventing the element from responding to requests or instructions, and limiting the functionality of the element to a subset of functions. For example, the IMC (120) may instruct the network adapter to shut down or restrict outgoing data transmissions to local destinations (such as the management servers). As another example, the IMC (120) may restrict write access to disk storage to prevent further damage to stored data. As yet another example, the IMC (120) may eliminate access to shared storage to prevent the spread of an infection.

Figure 5:
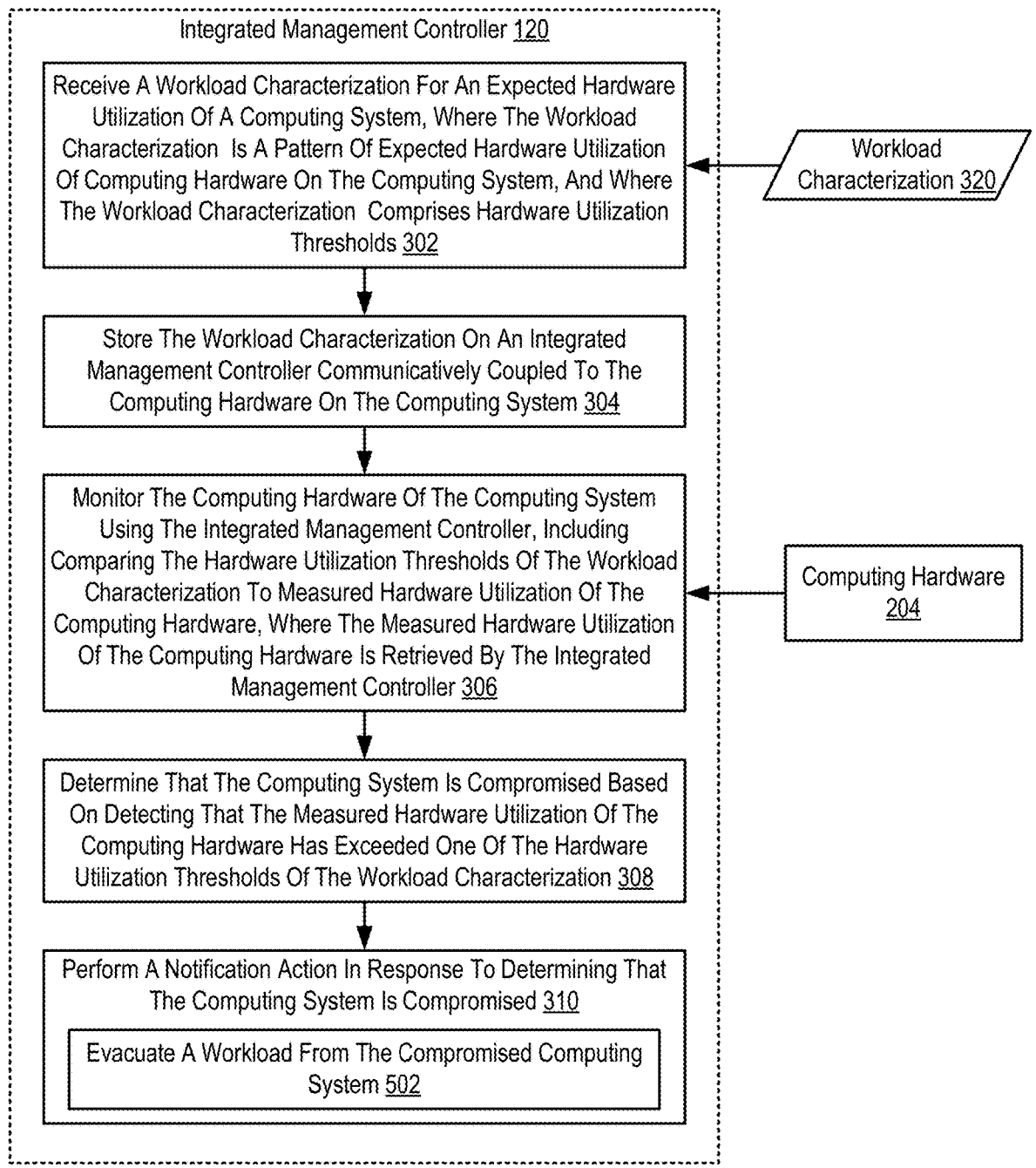
FIG. 5 sets forth a flow chart illustrating an exemplary method for detecting a compromised system using an integrated management controller according to embodiments of the present invention.

For further explanation, FIG. 5 sets forth a flow chart illustrating a further exemplary method for detecting a compromised system using an integrated management controller according to embodiments of the present invention that includes receiving (302) a workload characterization (320) for an expected hardware utilization of a computing system, wherein the workload characterization (320) is a pattern of expected hardware utilization of computing hardware on the computing system, and wherein the workload characterization (320) comprises hardware utilization thresholds; storing (304) the workload characterization (320) on an integrated management controller (120) communicatively coupled to the computing hardware (204) on the computing system; monitoring (306) the computing hardware (204) of the computing system using the integrated management controller (120), including comparing the hardware utilization thresholds of the workload characterization (320) to measured hardware utilization of the computing hardware, wherein the measured hardware utilization of the computing hardware is retrieved by the integrated management controller (120); determining (308) that the computing system is compromised based on detecting that the measured hardware utilization of the computing hardware has exceeded one of the hardware utilization thresholds of the workload characterization (320); and performing (310) a notification action in response to determining that the computing system is compromised.

The method of FIG. 5 differs from the method of FIG. 3, however, in that performing (310) a notification action in response to determining that the computing system is compromised includes evacuating (502) a workload from the compromised computing system. Evacuating (502) a workload from the compromised computing system may be carried out by the IMC (120) placing the computing system into maintenance mode. In response, the management server may forcibly remove the workload from the computing system. Forcibly removing the workload from the computing system may include shutting down a virtual machine hosting the workload.

Figure 6:
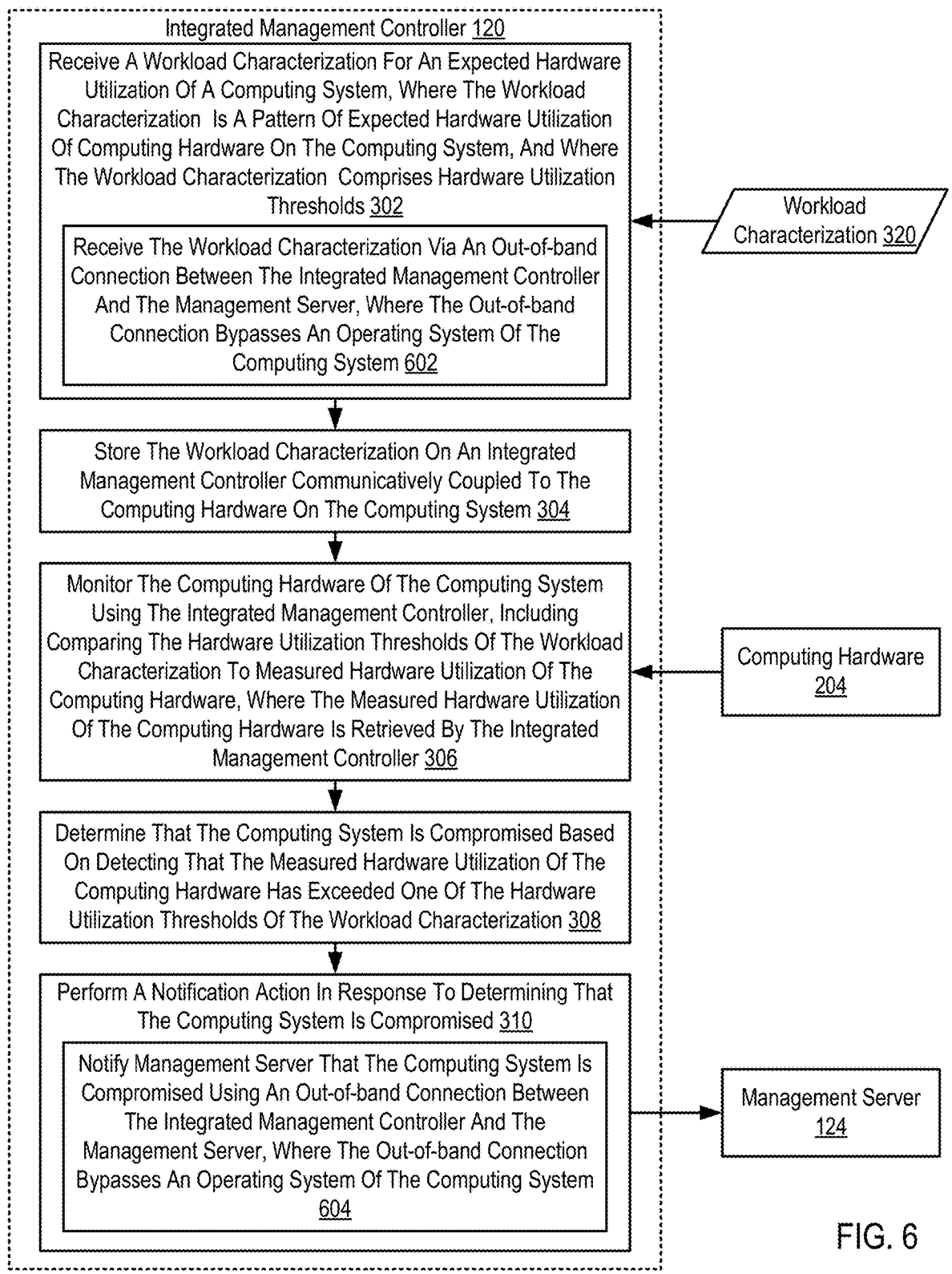
FIG. 6 sets forth a flow chart illustrating an exemplary method for detecting a compromised system using an integrated management controller according to embodiments of the present invention.

For further explanation, FIG. 6 sets forth a flow chart illustrating a further exemplary method for detecting a compromised system using an integrated management controller according to embodiments of the present invention that includes receiving (302) a workload characterization (320) for an expected hardware utilization of a computing system, wherein the workload characterization (320) is a pattern of expected hardware utilization of computing hardware on the computing system, and wherein the workload characterization (320) comprises hardware utilization thresholds; storing (304) the workload characterization (320) on an integrated management controller (120) communicatively coupled to the computing hardware (204) on the computing system; monitoring (306) the computing hardware (204) of the computing system using the integrated management controller (120), including comparing the hardware utilization thresholds of the workload characterization (320) to measured hardware utilization of the computing hardware, wherein the measured hardware utilization of the computing hardware is retrieved by the integrated management controller (120); determining (308) that the computing system is compromised based on detecting that the measured hardware utilization of the computing hardware has exceeded one of the hardware utilization thresholds of the workload characterization (320); and performing (310) a notification action in response to determining that the computing system is compromised.

The method of FIG. 6 differs from the method of FIG. 3, however, in that receiving (302) a workload characterization (320) for an expected hardware utilization of a computing system, wherein the workload characterization (320) is a pattern of expected hardware utilization of computing hardware on the computing system, and wherein the workload characterization (320) comprises hardware utilization thresholds includes receiving (602) the workload characterization (320) via an out-of-band connection between the integrated management controller (120) and the management server (124), wherein the out-of-band connection bypasses an operating system of the computing system.

Receiving (602) the workload characterization (320) via an out-of-band connection between the integrated management controller (120) and the management server (124), wherein the out-of-band connection bypasses an operating system of the computing system may be carried out by the management server (124) sending the IMC (120) the workload characterization corresponding to an idle state or the workload currently executing on the computing system or expected to be executing on the computing system. The workload characterization (320) may be received via an out-of-band connection between the IMC (120) and the management server (124) that bypasses the operating system, network connection to the operating system, and/or a hypervisor of the computing system.

The method of FIG. 6 also differs from the method of FIG. 3 in that performing (310) a notification action in response to determining that the computing system is compromised includes notifying (604) the management server (124) that the computing system is compromised using an out-of-band connection between the integrated management controller (120) and the management server (124), wherein the out-of-band connection bypasses an operating system of the computing system. Notifying (604) the management server (124) that the computing system is compromised using an out-of-band connection between the integrated management controller (120) and the management server (124), wherein the out-of-band connection bypasses an operating system of the computing system may be carried out by IMC (120) generating the notification for the management server (124), and sending the notification over a connection that bypasses the operating system, network connection to the operating system, and/or a hypervisor of the computing system.

In view of the explanations set forth above, readers will recognize that the benefits of detecting a compromised system using an integrated management controller according to embodiments of the present invention include:

Improving the operation of a computing system by detecting that a computing system is compromised without relying on alerts generated by or via the operating system of the computing system, increasing computing system reliability and security.

Improving the operation of a computing system by utilizing an integrated management controller to bypass the operating system (or hypervisor) and monitor the computing hardware on a computing system for indications that the computing system has been compromised, increasing computing system reliability and security.

Exemplary embodiments of the present invention are described largely in the context of a fully functional computer system for detecting a compromised system using an integrated management controller. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computing hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising: by program instructions on an integrated management controller, receiving a workload characterization for an expected hardware utilization of a computing system, wherein the workload characterization is a pattern of expected hardware utilization of computing hardware on the computing system, and wherein the workload characterization comprises hardware utilization thresholds, wherein the expected hardware utilization is a total amount of activity performed by an element of computing hardware within the computing system;
    storing the workload characterization on the integrated management controller, wherein the integrated management controller is communicatively coupled to the computing hardware on the computing system;
    monitoring the computing hardware of the computing system using the integrated management controller, including comparing the hardware utilization thresholds of the workload characterization to measured hardware utilization of the computing hardware, wherein the measured hardware utilization of the computing hardware is retrieved by the integrated management controller, wherein the measured hardware utilization of the computing hardware includes one of energy used by a processor or percentage of processing power used;
    determining that the computing system is compromised based on detecting that the measured hardware utilization of the computing hardware has exceeded one of the hardware utilization thresholds of the workload characterization; and
    performing a notification action in response to determining that the computing system is compromised.

2. The method of claim 1, wherein performing the notification action in response to determining that the computing system is compromised comprises restricting access to the computing hardware using an out-of-band connection between the integrated management controller and the computing hardware of the computing system, wherein the out-of-band connection bypasses an operating system of the computing system.

3. The method of claim 1, wherein monitoring the computing hardware of the computing system using the integrated management controller comprises monitoring the computing hardware of the computing system via an out-of-band connection between the integrated management controller and the computing hardware of the computing system, wherein the out-of-band connection bypasses an operating system of the computing system.

4. The method of claim 1, wherein receiving the workload characterization for the expected hardware utilization of the computing system comprises receiving the workload characterization via an out-of-band connection between the integrated management controller and a management server, wherein the out-of-band connection bypasses an operating system of the computing system.

5. The method of claim 1, wherein performing the notification action in response to determining that the computing system is compromised comprises notifying a management server that the computing system is compromised using an out-of-band connection between the integrated management controller and the management server, wherein the out-of-band connection bypasses an operating system of the computing system.

6. The method of claim 1, wherein determining that the computing system is compromised comprises determining that the computing system is infected with malware; and wherein the measured hardware utilization of the computing hardware includes internal temperature data.

7. An apparatus comprising a computing device, a computer processor, and a computer memory operatively coupled to the computer processor, the computer memory having disposed within it computer program instructions that, when executed by the computer processor, cause the apparatus to carry out the steps of:
    receiving a workload characterization for an expected hardware utilization of a computing system, wherein the workload characterization is a pattern of expected hardware utilization of computing hardware on the computing system, and wherein the workload characterization comprises hardware utilization thresholds, wherein the expected hardware utilization is a total amount of activity performed by an element of computing hardware within the computing system;
    storing the workload characterization on an integrated management controller communicatively coupled to the computing hardware on the computing system;
    monitoring the computing hardware of the computing system using the integrated management controller, including comparing the hardware utilization thresholds of the workload characterization to measured hardware utilization of the computing hardware, wherein the measured hardware utilization of the computing hardware is retrieved by the integrated management controller, wherein the measured hardware utilization of the computing hardware includes one of energy used by a processor or percentage of processing power used;
    determining that the computing system is compromised based on detecting that the measured hardware utilization of the computing hardware has exceeded one of the hardware utilization thresholds of the workload characterization; and
    performing a notification action in response to determining that the computing system is compromised.

8. The apparatus of claim 7, wherein performing the notification action in response to determining that the computing system is compromised comprises restricting access to the computing hardware using an out-of-band connection between the integrated management controller and the computing hardware of the computing system, wherein the out-of-band connection bypasses an operating system of the computing system.

9. The apparatus of claim 7, wherein monitoring the computing hardware of the computing system using the integrated management controller comprises monitoring the computing hardware of the computing system via an out-of-band connection between the integrated management controller and the computing hardware of the computing system, wherein the out-of-band connection bypasses an operating system of the computing system.

10. The apparatus of claim 7, wherein receiving the workload characterization for the expected hardware utilization of the computing system comprises receiving the workload characterization via an out-of-band connection between the integrated management controller and a management server, wherein the out-of-band connection bypasses an operating system of the computing system.

11. The apparatus of claim 7, wherein performing the notification action in response to determining that the computing system is compromised comprises notifying a management server that the computing system is compromised using an out-of-band connection between the integrated management controller and the management server, wherein the out-of-band connection bypasses an operating system of the computing system.

12. The apparatus of claim 7, wherein determining that the computing system is compromised comprises determining that the computing system is infected with malware.

13. A computer program product including a non-transitory computer readable medium, the computer program product comprising computer program instructions that, when executed, cause a computer to carry out the steps of:

receiving a workload characterization for an expected hardware utilization of a computing system, wherein the workload characterization is a pattern of expected hardware utilization of computing hardware on the computing system, and wherein the workload characterization comprises hardware utilization thresholds, wherein the expected hardware utilization is a total amount of activity performed by an element of computing hardware within the computing system;

storing the workload characterization on an integrated management controller communicatively coupled to the computing hardware on the computing system;

monitoring the computing hardware of the computing system using the integrated management controller, including comparing the hardware utilization thresholds of the workload characterization to measured hardware utilization of the computing hardware, wherein the measured hardware utilization of the computing hardware is retrieved by the integrated management controller, wherein the measured hardware utilization of the computing hardware includes one of energy used by a processor or percentage of processing power used;

determining that the computing system is compromised based on detecting that the measured hardware utilization of the computing hardware has exceeded one of the hardware utilization thresholds of the workload characterization; and performing a notification action in response to determining that the computing system is compromised.

14. The computer program product of claim 13, wherein performing the notification action in response to determining that the computing system is compromised comprises restricting access to the computing hardware using an out-of-band connection between the integrated management controller and the computing hardware of the computing system, wherein the out-of-band connection bypasses an operating system of the computing system.

15. The computer program product of claim 13, wherein monitoring the computing hardware of the computing system using the integrated management controller comprises monitoring the computing hardware of the computing system via an out-of-band connection between the integrated management controller and the computing hardware of the computing system, wherein the out-of-band connection bypasses an operating system of the computing system.

16. The computer program product of claim 13, wherein receiving the workload characterization for the expected hardware utilization of the computing system comprises receiving the workload characterization via an out-of-band connection between the integrated management controller and a management server, wherein the out-of-band connection bypasses an operating system of the computing system.

17. The computer program product of claim 13, wherein performing the notification action in response to determining that the computing system is compromised comprises notifying a management server that the computing system is compromised using an out-of-band connection between the integrated management controller and the management server, wherein the out-of-band connection bypasses an operating system of the computing system.

* * * * *